Nov. 19, 1968  W. H. CLIFTON  3,411,450
PUMP
Filed March 7, 1967  2 Sheets-Sheet 1
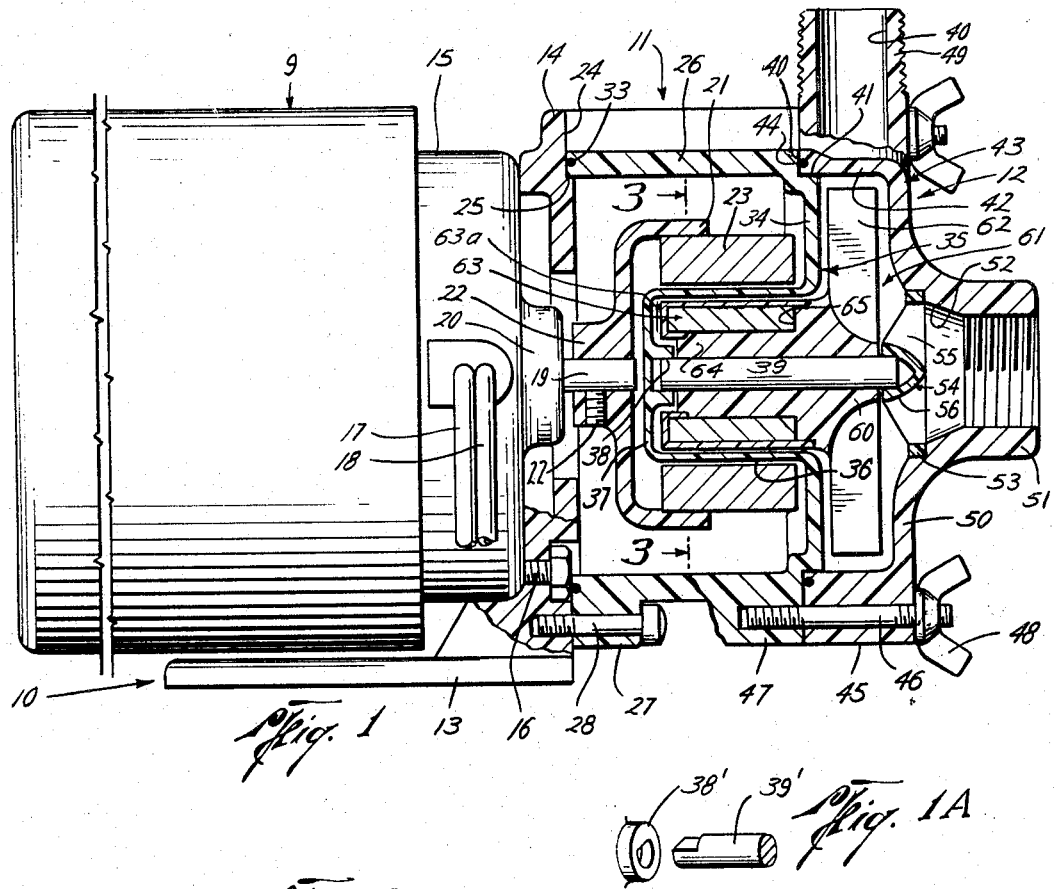
Fig. 1
Fig. 1A
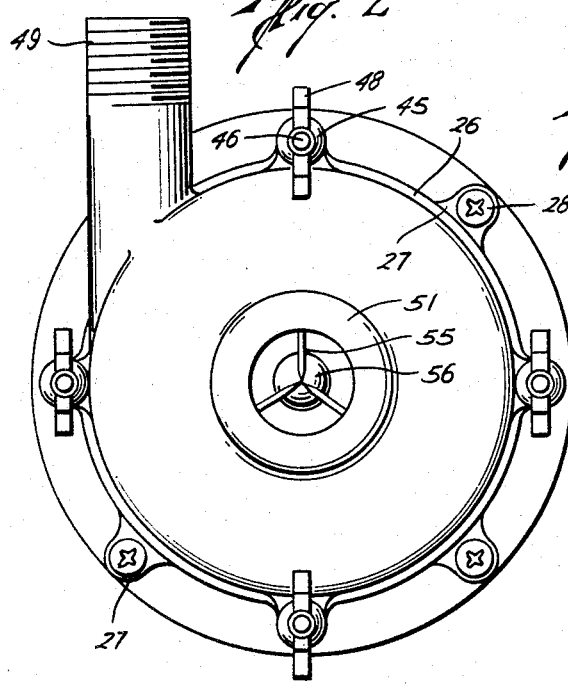
Fig. 2
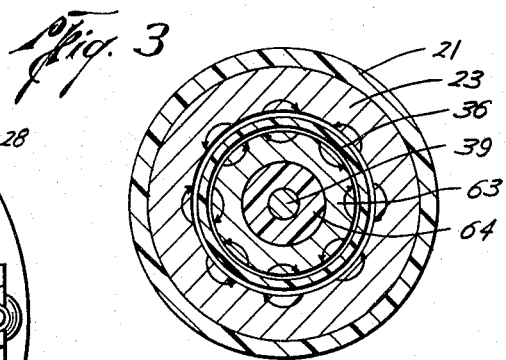
Fig. 3
William H. Clifton
INVENTOR.
BY Murray Robinson
ATTORNEY

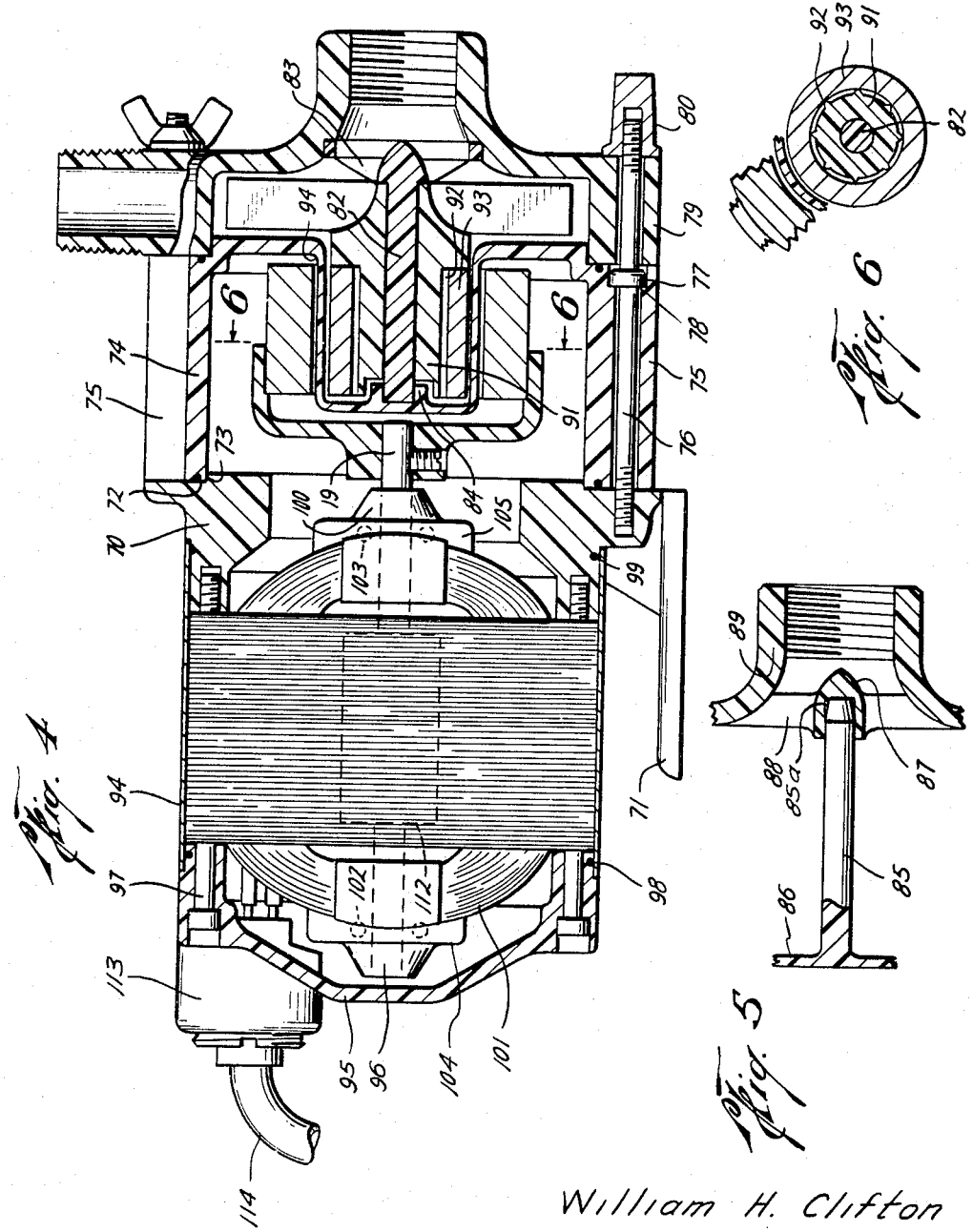

3,411,450
PUMP
William H. Clifton, Oklahoma City, Okla., assignor to Little Giant Corporation, Oklahoma City, Okla., a corporation of Oklahoma
Filed Mar. 7, 1967, Ser. No. 621,297
16 Claims. (Cl. 103—87)

ABSTRACT OF THE DISCLOSURE

A centrifugal pump is driven by a motor through a radial gap magnetic coupling. A non-magnetic, stovepipe hat shaped separator separates the drive magnet from the driven magnet and closes the pump housing. An integral cylindrical extension from the rim of the separator provides a housing for the coupling. The driven magnet and the pump impeller form a single rotor which rotates on a shaft captured with a slip fit between or integral at one end with bearing means in the crown of the separator and bearing means carried by a spider at the inlet to the pump housing.

Background of the invention

Field of invention.—This invention pertains to electric motor driven, magnetically-coupled, pumps, especially small centrifugal pumps suitable for pumping water and beverages and other liquids, driven by a fractional horse power motor. More particularly the invention relates to bearing means for the pump rotor.

Discussion of prior art.—The present invention is an improvement upon the 1960 pump design of the assignee of the present applicant wherein the pump rotor and the driven magnet were mounted on a fixed cantilever shaft affixed at one end to the crown of the hat shaped separator.

It is well known to eliminate the shaft seal between a pump and its drive motor by employing a magnetic coupling. Such couplings may be of either the axial gap type as shown in U.S. Patent No. 2,429,114 to Whitted or of the radial gap type shown in U.S. Patent No. 1,568,305 to Williams. In such case, as shown by Williams, the shell or housing for the magnetic coupling may provide the support on which are mouted both the motor and pump housings.

The diaphragm separating the magnet structures of a radial gap type copuling is cylindrical in shape and together with the closure sealing one end of the cylindrical part of the diaphragm forms an imperforate cup shaped separator, as shown in U.S. Patent No. 591,395, issued in 1897 to Fay. One magnet rotates inside the cup and the other rotates around the outside of the cup.

In the Williams construction the magnet inside the cup is mounted on a rotatable shaft which also carries the pump impeller. The shaft is rotatably mounted in a bearing carried by the pump housing disposed between the magnet and the pump rotor. A like construction is shown in U.S. Patent No. 3,195,467 to Collet. In U.S. Patent No. 3,238,878 to Martin the construction is similar except that the rotating shaft is supported in a bearing mounted in the separator cup In U.S. Patent No. 2,463,409 to Moody, the magnet inside the cup is connected to a fan shaft, the shaft being rotatably mounted by a bearing carried by a post supported from the bottom of the separator cup and by a bearing carried by the fan housing at the other side of the fan from the magnetic coupling.

It is also known to use a fixed shaft on which the pump impeller and inside magnet rotate together as a unit. The shaft may be a stud shaft supported at one end by the pump housing adjacent the inlet thereof as shown by U.S. Patent No. 2,745,641 to Jacobs. A fixed shaft construction in which the shaft is supported at one end by the bottom of the separator cup is shown in U.S. Patent No. 2,549,121 to Osterheld. A similar construction shown in U.S. Patent 2,931,307 to Smith has been known commercially for years as the "canned rotor pump." The aforementioned 1960 pump design by applicant's assignee was of this general type. A fixed shaft construction in which the shaft is supported at both ends is disclosed in U.S. Patents No. 2,481,172 to Staggs (axial gap magnetic coupling) and 3,001,479 to Swenson et al. (radial gap), one end of the fixed shaft being supported by the pump housing at the side of the impeller opposite from the magnet, the other end of the shaft being supported by the bottom of the separator cup.

A species of magnetically driven pump employing fixed pivot pins at each end of the rotor is shown in U.S. Patent 2,629,330 to Meline, and a construction in which the rotor is free, there being neither shaft or bearings is shown in U.S. Patent 2,655,354 to Murray.

Summary of the invention

According to the invention the shaft on which the pump impeller and inside magnet are rotatably mounted is slip fitted into bearings at each end of the shaft. This enables the shaft to be assembled without the need for press fitting. It also permits the pump impeller to be removed without the use of tools so that the pump can be cleaned in conformance with the requirements of the National Sanitation Foundation, University of Michigan Department of Public Health, Ann Arbor, Mich. At the same time it provides support for both ends of the shaft, substantially eliminating bending moments that exist at the root of a stud shaft.

In order to obtain proper alignment of the pump shaft the magnetic coupling housing is made integral with the separator diaphragm and the combination housing separator is provided with an annular rabbet to receive the rim of the pump housing; also the motor support bracket (which is one embodiment is combined with the motor end bell) is likewise provided with an annular rabbet to receive the rim of the housing-separator. Upon assembly, the spider, bearing, separator, separator bearing, and motor shaft are coaxial with the pump shaft. In order that the coupling housing be imperforate so as to fully enclose the coupling, fins are provided on the exterior thereof to receive stud-screws for screwing the housing-separator to the motor bracket and bolting the pump housing to the housing-separator. Thumb nuts are used on the stud-screws so that the pump housing is removable without tools. The motor may be made submersible by an inexpensive enclosure including a heat conducting tubular body made of metal resistant to corrosion and fluid attack, the body being closed by plastics material end bells and the housing-separator to form a sealed unit. The housing separator and the pump housing may also be made of plastics material. The pump shaft may also be made of plastics material and may be integral with the crown of the separator or with the spider; the spider may be integral with the pump housing. The impeller may be made of plastics material and include a splined, tubular extension to receive an annular driven magnet of the ceramic type.

Brief description of the drawings

FIGURE 1 is a side elevation, partly in section, of a motor-pump unit embodying the invention;
FIGURE 1A is a fragmentary pictorial detail showing a modification;
FIGURE 2 is an end view of the unit shown in FIGURE 1;
FIGURE 3 is a transverse vertical section taken at plane 3—3 of FIGURE 1:

FIGURE 4 is a longitudinal vertical section through a motor pump unit showing a modified form of the invention;

FIGURE 5 is a fragmentary vertical section showing another modification; and

FIGURE 6 is a transverse vertical section taken at plane 6—6 of FIGURE 4.

*Description of the preferred embodiments*

Referring now to FIGURE 1 there is shown a motor-pump unit comprising an air cooled, electric motor 9, which may be a shaded pole induction motor, a support bracket 10, a magnetic coupling 11, and a pump 12. The support bracket includes a base 13 and a generally circular plate 14 secured to the motor end bell 15 by a plurality of through bolts 16. Electric power is supplied to the motor through electric conductors 17, 18. Motor shaft 19 projects out of the end bell through bearing housing 20. Cup shaped magnet holder 21 has an apertured hub 22 slipped over the free end of the motor shaft 19 and secured thereto by set screw 22. A circular permanent magnet 23 is press fitted into magnet holder 21.

An annular land 24 on the bracket plate 14 extending around annular shoulder 25 forms an annular alignment rabbet receiving imperforate cylindrical tubular housing 26 for the magnetic coupling which centers it relative to motor shaft 19. Around the exterior of housing 26 are a plurality of apertured bosses 27 (see also FIGURE 2) adapted to receive cap screws 28 screwed into bracket plate 14, thereby to hold the housing to the bracket. An O-ring 33 in the rim of housing 26 provides means to seal the housing to the bracket plate. Housing 26 is integral with the brim 34 of a hat shaped separator 35. The housing 26 and separator 35 together form a housing-separator. The separator includes a cylindrical tubular diaphragm 36 and a disc shaped crown 37. The outer diameter of tubular diaphragm 36 is such as to fit closely inside magnet 23, leaving enough clearance however so as not to interfere with rotation of magnet 23 about the diaphragm. The length of tubular diaphragm 36 is preferably sufficient to extend clear through magnet 23 toward hub 22 of the magnet holder, there being clearance however between the hub and outside of crown 37 of the hat shaped separator so as not to interfere with rotation of the magnet holder 21. The inside of crown 37 is provided with an annular boss 38 forming a bearing or support means for one end of rotor shaft 39. Shaft 39 may be made of wear resistant metal that is relatively unaffected by pump fluids, e.g. stainless steel or monel, or it may be made of a similarly strong and resistant plastics material, e.g. "Teflon."

At the juncture of magnet housing 26 and brim 34 of the separator 35 there is formed an annular land 40 around shoulder 41 forming an annular alignment rabbet which receives the tubular cylindrical body 42 of pump casing 43 and centers it relative to rotor shaft 39. An O-ring 44 in the rim of pump casing body 42 seals the casing to the end of the magnetic coupling housing 26. A plurality of apertured bosses 45 (see also FIGURE 2) around the exterior of pump casing body 42 register with the threaded studs 46 anchored in bosses 47 around the exterior of magnetic coupling housing 26. Wing nuts 48 provide means releasable without tools for securing the pump casing 43 to the magnetic coupling housing 26. The bosses 47 are displaced azimuthally relative to bosses 27 so that a screw driver can easily be used to tighten or release cap screws 28 that secure the magnetic coupling housing to the motor mounting bracket.

A vertical threaded pipe 49 extending tangentially from the side of pump casing body 42 provides a fluid outlet for the pump. The end of pump casing body 42 away from land 40 is formed integrally with a circular end plate 50 which is provided with a threaded inlet pipe 51 at its center. Rabbetted into flaring mouth 52 of the pump inlet is the base ring 53 of a spider 54, preferably made of the same material as shaft 39 or pump casing 43. The spider includes a plurality of webs 55 each connected at its radially outer end to base ring 53 and at its inner end to a cup 56 forming a bearing or support means. Cap 56 supports one end of shaft 39.

The ends of shaft 39 make slip fits with the bearings 38 and 56, loose enough to allow the parts to be assembled without the aid of presses. Preferably shaft 39 fits in its bearings loosely enough to allow the shaft 39 to rotate in the bearings. However if desired one or both ends of the shaft may be formed with a square or flat fitting a correlative aperture in the bearing to prevent rotation, as shown in FIGURE 1A. In any event, whether the ends of the shaft are square or round the shaft is loose enough in its bearings to allow manual assembly and disassembly without the need for tools.

Rotatably mounted on shaft 39 is the central hub 60 of pump impeller 61. The pump impeller 61 further includes a plurality of azimuthally spaced radial blades 62 formed integrally with hub 60. The hub 60 extends into tubular diaphragm 36 providing means supporting annular driven permanent magnet 63 and also providing a driving connection of the magnet to the impeller. The magnet 63 is preferably a ceramic magnet and is press fitted onto hub extension 64 against shoulder 65. It fits closely inside tubular diaphragm 36 in order to be as close as possible to magnet 23 yet with sufficient clearance to be free to rotate. The magnet 63 is of about the same length as magnet 23 so that the overall length of the magnetic coupling may be a minimum. The magnet 63 extends beyond the end of hub 60 overlapping annular boss 38.

Referring to FIGURE 3, the annular permanent magnets 23 and 63 may be magnetized so that each has a plurality e.g. eight, poles about its circumference, resulting in the flux pattern shown, thereby causing the magnet 63 to rotate in synchronism with driving magnet 23. The diaphragm 36 is made of non-magnetic material in order not to short circuit the permanent magnets which would prevent their flux from interlocking. Also, diaphragm 36 is preferably made of electrically non-conductive material in order to prevent heating thereof by eddy currents. According to the invention the diaphragm 36 together with crown 37, brim 34, and magnetic coupling housing 26 is formed integrally of a plastics material such as an epoxy resin or glass filled polypropylene, or "Teflon," or glass filled "nylon," a material which is unaffected by a wide variety of fluids met with in pumping service which will attack ordinary steel and other inexpensive metal materials. This is an important consideration in connection with a pump useful in handling beverages, many of which are mildly acidic, e.g. orange juice and lemonade. Note that the separator 35 closes one end of the pump casing to form the impeller chamber and is exposed to fluids therein.

The pump casing 43 is also preferably made of a plastics material, preferably a material the same as that of which the separator-housing is made, since such material is not only relatively impervious to acid attack but also strong, tough, and of low specific gravity providing a rugged light weight casing.

The hub 60 and impeller blades 62 are also preferably made of the same plastics material. The driven magnet 63 may be encapsulated with plastics material at the same time the hub and impeller blades are molded, forming a unitized rotor. Alternatively, a molded plastics material shell 63A may be placed over the magnet 63 and unitized with the hub by means such as a solvent cement and an ultrasonic sealer. Alternatively the driven magnet may be placed on the rotor hub 60 after it has been molded and then dipped in a plastics material, e.g. epoxy, Teflon, or polyurethane. Preferably both ends of the rotor hub and the bearings which support the impeller shaft are also coated with polyurethane. The polyurethane coatings provide wear resisting surfaces to take the axial thrust loads between the ends of the hub and the bearings 38, 56. The polyurethane coating of the magnets reduces wear on the diaphragm 36 in the later stakes of the life of the rotor when it may tend to lose concentricity due to wear on the hub and shaft.

Whenever it is desired to remove the pump rotor or shaft for cleaning, repair or replacement, it is a simple matter to unscrew wing nuts 48 and remove the pump casing, thereby exposing the rotor which is itself easily removed. The screws 28 hold the magnet housing in place even though the pump housing has been removed.

After cleaning, repair, or replacement of rotor or shaft or both, the parts can easily be reassembled in an order the reverse of the order just described. No tools are necessary. The construction is likewise easy and hence inexpensive to assemble initially. Inventories are minimized since any shaft and rotor can be replaced with shaft or rotor or both of different material as needed for pumping different fluids. The shaft is inexpensive since it can be made by cutting off lengths of ground bar stock without further machining operations.

Referring now to FIGURE 4 there is shown a modified form of the invention. The construction is generally the same as that of the previously described embodiment and only the points of difference will be mentioned. In this construction the motor end bell 70 is itself formed with a mounting base 71, thereby eliminating the need for a separate mounting bracket. The end bell is formed with annular land 72 around annular shoulder 73 providing an annular rabbet to receive the magnetic coupling housing 74. The housing 74 is provided with radial fins 75 having apertures therethrough to receive stud screws 76 having intermediate flanges 77 received in counter bores 78 to secure the coupling housing to the end bell. The stud screws extend through apertured bosses 79 around the body of the pump casing and the latter is held in place by plastic thumb-screws 80 screwed onto stud screws 76. The rotor shaft 82 is formed integrally at one end with spider 83 and supported with a slip fit in bearing 84 at the other end. Alternatively, as shown in FIGURE 5, the rotor shaft 85 may be formed integrally with the crown 86 of the hat-shaped magnet separator and the free end slipped into a bearing cup 87 carried by spider 88 as shown in FIGURE 5. The end 85A of shaft 85 may be tapered to facilitate assembly. Also, the spider 88 may be made integral with pump housing or volute 89, whether the shaft be integral therewith or not.

As shown best in FIGURE 6 the impeller hub extension 91 is provided with a plurality of sharp splines 92. The splines may for example be of equilateral triangular cross section 1/32 inch in altitude. The driven magnet 93 is pressed over the splines, the spaces between the splines being fitted; for example, with silicone rubber to keep the dirt out. If the plastics material of the hub swells due to water absorption, or for other reason, the splines can flatten to relieve the stress on the ceramic magnet 93 which might otherwise crack.

The motor of FIGURE 4, shown in more detail than in FIGURE 1, is a submersible motor, the motor housing 94 being made of brass, stainless steel, Monel, or other suitable material which is resistant to the fluid being pumped and will carry heat away from the motor. Alternatively the housing, may be made of less expensive material such as cold rolled steel and the steel coated with epoxy resin or polyurethane or other acid and corrosion resistant plastics material, sprayed onto the steel or the steel may be dipped in plastics material. The motor may be filled with oil if desired.

End bell 70 may be fabricated from similar fluid attack and corrosion resistant metal or may be formed entirely of plastics material, e.g. the same as that of the pump and coupling housings.

End bell 95 over bearing cap 96 may be formed of the same material as end bell 70. The end bells are secured to the motor stator by through bolts 97. Housing 94 is clamped between the end bells and sealed thereto by O-rings 98, 99. The motor is thus totally enclosed by end bell 95, housing 94, end bell 70, and coupling housing 74, there being no shaft seal required where the shaft 19 projects through end bell 70 beyond bearing cap 100, and this entire subassembly is preferably dipped in polyurethane to seal it against leakage and to increase corrosion resistance. The motor field windings 101 and the bearings 102, 103 carried on the stator by brackets 104, 105 inside caps 96, 100, the shaft 19 on which is mounted rotor 112, and other delicate parts of the motor are thus protected. A special fluid tight inlet 113 for electric cable 114 is provided.

The plastics material shaft of the FIGURE 4 construction is especially well adapted for pumps intended for pumping corrosive fluids, eliminating the cost of an alloy metal shaft. Supporting the shaft at both ends makes it possible to use a smaller diameter shaft while still providing adaquate strength. The shaft is preferably integral with the spider since that makes it possible to replace the shaft without replacing the separator-housing. Although in the FIGURE 4 construction the shaft is shown as made of plastics material, it could be made of metal or other material suitable for the spider (or the separator if made integral therewith). Even in the FIGURE 1 construction a variety of other materials could be used for the shaft in addition to the metal as described. Other features of the FIGURES 1 and 4 embodiments can also be interchanged; for example, the combination end bell and support base of FIGURE 4 could also be used in the FIGURE 1 construction, as could the stud-screws 76.

While preferred embodiments of the invention have been shown and described, many modifications thereof can be made by one skilled in the art without departing from the spirit of the invention.

I claim:
1. A motor pump unit comprising:
  a motor having a shaft extending from one end thereof,
  a centrifugal pump comprising a housing and an impeller rotatably mounted in the pump housing,
  a magnetic coupling including an annular driving magnet connected to the motor shaft, an annular driven magnet connected to the impeller forming therewith a rotor, and a stovepipe hat-shaped non-magnetic separator including a cylindrical tubular diaphragm separating the magnets and an annular flange extending radially outwardly from the diaphragm forming the brim of the separator, said separator being connected to and closing one side of the pump housing,
  said rotor being mounted on a shaft that is supported at one end by the pump casing and at the other end by the crown of the hat-shaped magnet separator, the rotor being freely mounted on the shaft for rotation relative thereto,
  the hat-shaped separator having a cylindrical tubular housing of larger inner diameter than the outer diameter of said tubular diaphragm integrally connected to the brim of the separator and extending from said brim coaxially with the separator diaphragm and around the outside of the driving magnet providing a magnetic coupling housing, the separator and housing both being made of non-magnetic material.

2. A motor pump unit comprising:
  a motor having a shaft extending from one end thereof,
  a centrifugal pump comprising a housing and an impeller rotatably mounted in the pump housing,
  and a magnetic coupling including an annular driving magnet connected to the motor shaft, an annular driven magnet connected to the impeller forming therewith a rotor, and a stovepipe hat-shaped non-magnetic separator including a cylindrical tubular diaphragm separating the magnets and connected to and closing one side of the pump housing, said rotor being mounted on a shaft that is supported at one end by the pump casing and at the other end by the crown of the hat-shaped magnet separator, the rotor being freely mounted on the shaft for rotation relative thereto, the hat-shaped separator having a cylindrical tubular housing integrally connected to the brim of the separator and extending coaxially with the separator diaphragm and around the outside of the driving magnet providing a magnetic coupling housing, said motor being provided with annular alignment means receiving the coupling housing and said coupling housing being provided with annular alignment means receiving the pump housing, said magnetic coupling housing and said alignment means forming means positioning the pump housing relative to the motor with the axis of rotation of the driving magnet aligned with the axis of the driven magnet.

3. A motor pump unit comprising:
a motor having a shaft extending from one end thereof,
a centrifugal pump comprising a housing and an impeller rotatably mounted in the pump housing,
and a magnetic coupling including an annular driving magnet connected to the motor shaft, an annular driven magnet connected to the impeller forming therewith a rotor, and a stovepipe hat-shaped non-magnetic separator including a cylindrical tubular diaphragm separating the magnets and connected to and closing one side of the pump housing,
said rotor being mounted on a shaft that is supported at one end by the pump casing and at the other end by the crown of the hat-shaped magnet separator, the rotor being freely mounted on the shaft for rotation relative thereto,
the hat-shaped separator having a cylindrical tubular housing integrally connected to the brim of the separator and extending coaxially with the separator diaphragm and around the outside of the driving magnet providing a magnetic coupling housing,
fins formed integrally with the magnetic coupling housing on the external periphery thereof and extending parallel to the axis of the coupling housing, stud-screws extending through apertures in said fins to engage threaded socket means carried by the motor, said stud-screws having radial flange means engaging said coupling housing in bores formed in the fin apertures, said pump housing having holes through which extend said stud-screws, and manually turnable nuts on the ends of said stud-screws holding said pump housing in place.

4. A motor pump unit comprising:
a motor having a shaft extending from one end thereof,
a centrifugal pump comprising a housing and an impeller rotatably mounted in the pump housing,
and a magnetic coupling including an annular driving magnet connected to the motor shaft, an annular driven magnet connected to the impeller forming therewith a rotor, and a stovepipe hat-shaped non-magnetic separator including a cylindrical tubular diaphragm separating the magnets and connected to and closing one side of the pump housing,
said rotor being mounted on a shaft that is supported in bearings at one end by the pump casing and in bearings at the other end by the crown of the hat-shaped magnet separator, the rotor being freely mounted on the shaft for rotation relative thereto,
the hat-shaped separator having a cylindrical tubular housing integrally connected to the brim of the separator and extending coaxially with the separator diaphragm and around the outside of the driving magnet providing a magnetic coupling housing,
said motor being provided with annular alignment means receiving the coupling housing and said coupling housing being provided with annular alignment means receiving the pump housing, said magnetic coupling housing and said alignment means forming means positioning the pump housing relative to the motor with the axis of rotation of the driving magnet aligned with the axis of the driven magnet,
said shaft and its bearing at one end at least being shaped to provide means to prevent rotation of the shaft relative to the bearing.

5. A motor pump unit comprising:
a motor having a shaft extending from one end thereof,
a centrifugal pump comprising a housing and an impeller rotatably mounted in the pump housing,
and a magnetic coupling including an annular driving magnet connected to the motor shaft, an annular driven magnet connected to the impeller forming therewith a rotor, and a hat-shaped non-magnetic separator including a tubular diaphragm separating the magnets, one end of said diaphragm being closed by means forming the crown of the hat-shaped separator, said separator adjacent its other end being connected to and closing one side of the pump housing,
said rotor being mounted on a shaft that is supported at one end by the pump casing and at the other end by the crown of the hat-shaped magnet separator, the rotor being freely mounted on the shaft for rotation relative thereto,
the end of the shaft supported by the crown of the magnet separator being integral with the crown of the magnet separator, the shaft, and separator being both made of non-magnetic plastics material.

6. A motor pump unit comprising:
a motor having a shaft extending from one end thereof,
a centrifugal pump comprising a housing and an impeller rotatably mounted in the pump housing,
and a magnetic coupling including an annular driving magnet connected to the motor shaft, an annular driven magnet connected to the impeller forming therewith a rotor, and a stovepipe hat-shaped non-magnetic separator including a cylindrical tubular diaphragm separating the magnets and connected to and closing one side of the pump housing,
said rotor being mounted on a shaft that is supported at one end by the pump casing and at the other end by the crown of the hat-shaped magnet separator, the rotor being freely mounted on the shaft for rotation relative thereto,
the hat-shaped separator having a cylindrical tubular housing integrally connected to the brim of the separator and extending coaxially with the separator diaphragm and around the outside of the driving magnet providing a magnetic coupling housing,
said pump housing having an inlet coaxial with said shaft, and said unit including a spider mounted at said inlet, said spider providing the support for the end of the shaft in the pump housing, said spider and shaft being integral.

7. Combination according to claim 6 wherein the spider is integral with said pump housing.

8. A motor pump unit comprising:
a motor having a shaft extending from one end thereof,
a centrifugal pump comprising a housing and an impeller rotatably mounted in the pump housing,
a magnetic coupling including an annular driving magnet connected to the motor shaft, an annular driven magnet connected to the impeller forming therewith a rotor,
a stovepipe hat-shaped non-magnetic separator including a cylindrical tubular diaphragm separating the magnets and connected to and closing one side of the pump housing,
said rotor being mounted on a shaft that is supported at one end by the pump casing and at the other end by the crown of the hat-shaped magnet separator, the rotor being freely mounted on the shaft for rotation relative thereto, said impeller including plastics material hub having a tubular portion on which said driven magnet is mounted, said tubular portion having splines extending axially thereof on its outer periphery, said driven magnet being an annular ceramic magnet pressed over said splines onto said tubular portion.

9. A motor-pump unit subassembly comprising an electric motor including a stator, a rotor, a shaft to which the rotor is affixed, and bearings at each end of the rotor, said bearings being carried by the stator, said shaft being rotatably mounted in said bearings, said rotor being disposed inside said stator, and electric conductor means on said stator to produce a field to rotate said rotor and shaft when the electric conductor means is energized, characterized by a tubular, corrosion- and fluid-attack resistant, metal, heat conducting housing around the stator, plastic materials end bells at each end of said tubular housing secured thereto in fluid tight relationship, one of said end bells having an aperture therein through which one end of said shaft extends, a cup-shaped supporting means connected to said one end of the shaft, an annular magnet means carried by said supporting means inside thereof, and integral, one-piece plastics material separator-housing connected to said one end bell in fluid tight relationship enclosing said magnet means, supporting means, and said one end of said shaft.

10. Combination according to claim 9 wherein said separator-housing includes a stovepipe hat-shaped separator having a tubular cylindrical housing formed integrally with the brim thereof, the separator including a tubular section fitting inside said magnet concentrically therewith, the rim of said cylindrical housing making the fluid tight seal with the end bell.

11. A motor pump unit comprising:
a motor having a shaft extending from one end thereof,
a centrifugal pump comprising a housing and an impeller rotatably mounted in the pump housing,
and a mangetic coupling including an annular driving magnet connected to the motor shaft, an annular driven magnet connected to the impeller forming therewith a rotor, and a stovepipe hat-shaped non-magnetic separator including a cylindrical tubular diaphragm separating the magnets and connected to and closing one side of the pump housing,
said rotor being mounted on a shaft that is supported at one end by the pump casing and at the other end by the crown of the hat-shaped magnet separator, the rotor being freely mounted on the shaft for rotation relative thereto,
said impeller including a plastics material hub having a tubular portion on which said driven magnet is mounted, and said unit including a molded plastics material shell over the outer part of said driven magnet unitized with said hub.

12. A motor pump unit comprising:
a motor having a shaft extending from one end thereof,
a centrifugal pump comprising a housing and an impeller rotatably mounted in the pump housing,
and a magnetic coupling including an annular driving magnet connected to the motor shaft, an annular driven magnet connected to the impeller forming therewith a rotor, and a hat-shaped non-magnetic separator including a tubular diaphragm separating the magnets and connected to and closing one side of the pump housing,
said rotor being mounted on a shaft that is supported at one end by the pump casing and at the other end by the crown of the hat-shaped magnet separator, said shaft being supported at one end at least by support means making a manual slip fit therewith releasable without rotation upon relative axial movement of said shaft and support means, the rotor being freely mounted on the shaft for rotation relative thereto, and
means carried by the unit positioning the pump housing relative to the motor to align the axis of rotation of the driving magnet with the axis of rotation of the driven magnet.

13. Combination of claim 12 wherein the other end of said shaft is supported in support means which makes a manual slip fit with the shaft releasable without rotation upon relative axial movement of said shaft and support means.

14. Combination according to claim 13 wherein the shaft is rotatably mounted in the support means at each end thereof.

15. Combination according to claim 13 wherein the shaft and its support means at one end at least are shaped to provide means to prevent rotation of the shaft relative to the support means.

16. Combination according to claim 12 wherein the pump housing has an inlet coaxial with the shaft and includes a spider mounted at said inlet, said spider carrying the support means for the one end of the shaft supported in the pump housing.

References Cited
UNITED STATES PATENTS

| | | | |
|---|---|---|---|
| 2,941,477 | 6/1960 | Dalton | 103—87 |
| 2,970,548 | 2/1961 | Berner | 103—87 |
| 3,001,479 | 9/1961 | Swenson et al. | 103—87 |
| 3,205,827 | 9/1965 | Zimmermann | 103—87 |

ROBERT M. WALKER, *Primary Examiner.*